(12) United States Patent
Palombini

(10) Patent No.: US 11,584,250 B1
(45) Date of Patent: Feb. 21, 2023

(54) CHARGING STATION FOR TRANSFERRING POWER BETWEEN AN ELECTRIC AIRCRAFT AND A POWER GRID

(71) Applicant: BETA AIR, LLC, South Burlington, VT (US)

(72) Inventor: John Charles Palombini, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/575,105

(22) Filed: Jan. 13, 2022

(51) Int. Cl.
| | |
|---|---|
| *B60L 53/50* | (2019.01) |
| *B60L 53/16* | (2019.01) |
| *B60L 53/62* | (2019.01) |
| *B60L 53/66* | (2019.01) |
| *B60L 53/30* | (2019.01) |
| *H02J 7/00* | (2006.01) |
| *H02J 3/32* | (2006.01) |
| *H04B 3/54* | (2006.01) |
| *B64F 1/36* | (2017.01) |
| *B64D 27/24* | (2006.01) |
| *B64C 29/00* | (2006.01) |
| *H02J 3/38* | (2006.01) |

(52) U.S. Cl.
CPC ............. *B60L 53/50* (2019.02); *B60L 53/16* (2019.02); *B60L 53/305* (2019.02); *B60L 53/62* (2019.02); *B60L 53/665* (2019.02); *B64F 1/362* (2013.01); *H02J 3/322* (2020.01); *H02J 7/0045* (2013.01); *H04B 3/548* (2013.01); *B60L 2200/10* (2013.01); *B64C 29/00* (2013.01); *B64D 27/24* (2013.01); *H02J 3/381* (2013.01); *H02J 2300/24* (2020.01); *H02J 2310/44* (2020.01)

(58) Field of Classification Search
CPC ........ B60L 53/50; B60L 53/16; B60L 53/305; B60L 53/62; B60L 53/665
See application file for complete search history.

(56) References Cited

U.S. PATENT DOCUMENTS

| | | | |
|---|---|---|---|
| 8,103,386 B2 | 1/2012 | Ichikawa et al. | |
| 8,686,687 B2 | 4/2014 | Rossi | |
| 8,841,881 B2 * | 9/2014 | Failing | H02J 5/00 320/108 |
| 10,406,927 B2 | 9/2019 | Baba | |

(Continued)

OTHER PUBLICATIONS

Ota et al., Autonomous Distributed V2G (Vehicle-to-Grid) considering Charging Request and Battery Condition, Oct. 13, 2010.

(Continued)

*Primary Examiner* — Richard V Muralidar
(74) *Attorney, Agent, or Firm* — Caldwell Intellectual Property Law

(57) ABSTRACT

Aspects relate to a charging station configured to transfer power between an electric aircraft and a power grid via a charging connection. In one or more embodiments, charging station may communicate with the power grid and/or electric aircraft via a communication network. For example, the charging station may be configured to receive a supply request from a power grid or a demand request from an electric aircraft and subsequently generate a control signal that transfers electrical power between the power grid and the electric aircraft via the charging connection.

21 Claims, 8 Drawing Sheets

(56) References Cited

U.S. PATENT DOCUMENTS

| | | | | |
|---|---|---|---|---|
| 10,714,974 | B2* | 7/2020 | Clifton | H02J 3/32 |
| 11,173,804 | B2* | 11/2021 | Tsubokura | B60L 50/50 |
| 11,273,724 | B1* | 3/2022 | Palombini | B60L 53/20 |
| 2011/0258112 | A1 | 10/2011 | Eder et al. | |
| 2011/0298422 | A1* | 12/2011 | Failing | B60L 53/66 |
| | | | | 320/109 |
| 2016/0363948 | A1 | 12/2016 | Steven et al. | |
| 2020/0083712 | A1 | 3/2020 | Arslan et al. | |
| 2021/0094437 | A1* | 4/2021 | Tsubokura | B60L 50/50 |
| 2021/0119482 | A1 | 4/2021 | Lowenthal et al. | |

OTHER PUBLICATIONS

Amamra et al., Vehicle-to-Grid Aggregator to Support Power Grid and Reduce Electric Vehicle Charging Cost, Dec. 23, 2019.

Mohamed et al., Two-layer Predictive Controller for V2G and G2V Services Using on Wireless Power Transfer Technology, Sep. 27, 2018.

Park et al., Link Adaptation Layer of HomePlug GreenPHYfor V2G Communication Interface, Dec. 31, 2012.

* cited by examiner

US 11,584,250 B1

CHARGING STATION FOR TRANSFERRING POWER BETWEEN AN ELECTRIC AIRCRAFT AND A POWER GRID

FIELD OF THE INVENTION

The present invention generally relates to the field of electric aircraft. In particular, the present invention is directed to a charging station of an electric aircraft and methods for transferring power between a connected electric aircraft and power grid.

BACKGROUND

Electric vehicles hold great promise in their ability to run using sustainably source energy, without increase atmospheric carbon associated with burning of fossil fuels. Perennial downsides associated with electric vehicles, include charging options and control.

SUMMARY OF THE DISCLOSURE

In an aspect, a charging station for an electric aircraft, the charging station including: an energy source configured to store electrical power; a connector configured to removably attach to a port of an electric aircraft to create a charging connection between a power grid and an electric aircraft; a controller configured to manage a power transfer between the electric aircraft and the power grid via the charging connection.

In another aspect, a method of transferring power via a charging connection between an electric aircraft and a power grid, the method including: attaching a charging station to an electric aircraft; receiving, by a controller of the charging station, a supply request or a demand request; delivering power to the power grid or the electric aircraft via a charging connection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a charging station configured to facilitate a charging connection between a power grid and an electric vehicle. More specifically, a charging station facilitates a transfer of power via a charging connection between a power grid and electric aircraft so that one may charge the other upon charging station receiving a request for delivery of electrical power.

Figure 1:
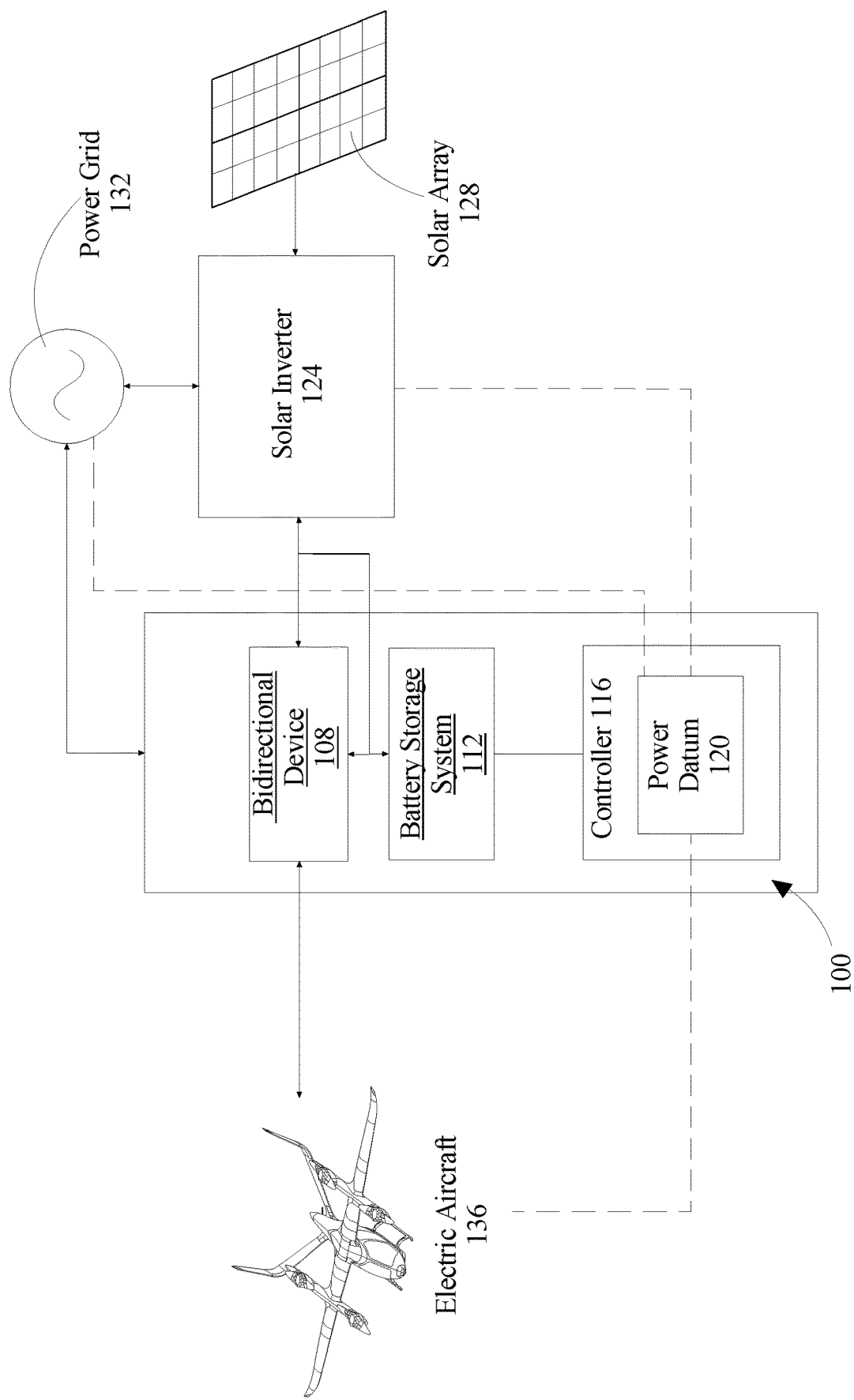
FIG. 1 is a block diagram illustrating an exemplary embodiment of a charging station for an electric aircraft in accordance with one or more aspects of the present disclosure.

Referring now to FIG. 1, an exemplary illustration of a charging station 100 configured to facilitate delivery of an electrical power between an electric aircraft 136 and a power grid 132 is presented in a block diagram. In one or more embodiments, electric aircraft 136 may be electrically connected to charging station 100. Charging station 100 may include an infrastructure that allows for the recharging of an electric aircraft. Charging station 100 may have a plurality of connections to comply with various electric aircraft needs. In one embodiment, charging station 100 may switch between power transfer standards, such as the combined charging system standard (CCS) and CHAdeMO standards. In another embodiment, charging station 100 may adapt to multiple demand response interfaces. Charging station 100 may include an ADR 2.0 as a demand response interface.

With continued reference to FIG. 1, charging station 100 may include a bidirectional charging connection. For the purposes of this disclosure, a "charging connection" is a connection associated with charging a power source, such as, for example, a battery of an electric vehicle, a power source of a charging station, or from a power grid 132. Charging connection may be a wired or wireless connection. Charging connection may include a communication between power grid 132 and electric vehicle 136 that is created by electric aircraft being connected to charging station 100, as discussed further in this disclosure. For example, and without limitation, one or more communications between charging station 100, power grid 132, and electric vehicle 136 may be facilitated by a charging connection. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charging station 100 and electric vehicle 136 may include an electric communication, where a current flows between charging station 100 and electric vehicle 136. As used in this disclosure, "informatic communication" is an attribute wherein two or more relata interact with one another by way of an information flow or information in general. For example, an informatic communication may include a sensor of electric vehicle 136 or a remote device of electric vehicle 136 providing information to controller 116 of charging station 100. In another example, and without limitation, an informatic communication may include a request signal, such as a demand request or a supply request, being transmitted between power grid 132 or electric aircraft 136 and charging station 100. As used in this disclosure, "mechanic communication" is an attribute wherein two or more relata interact with one another by way of mechanical means, for instance mechanic effort (e.g., force) and flow (e.g., velocity). For example, a fastener of a connector of charging station 100 may physically mate with a port 212 of electric vehicle 136 to create a mechanic communication between electric vehicle 136 and charging station 100.

In one or more embodiments, communication of a charging connection may include various forms of communication. For instance, communication of a charging connection may include a wireless communication. For example, and without, charging connection may include an informatic communication where electric vehicle 136 may transmit a demand request and/or data to charging station 100 via a wireless communication. A network may be used to facilitate communication between charging station 100 and electric vehicle 136. For instance, and without limitation, a multi-node network may be used to communicate data between electric vehicle 136 and charging station 132. A multi-node network may include a mesh network, for instance and without limitation, as described in U.S. Nonprovisional application Ser. No. 17/478,067 filed Sep. 17, 2021, titled "SYSTEM FOR A MESH NETWORK FOR USE IN AIRCRAFTS," the entirety of which is incorporated herein by reference. Data may include a flight plan, expected or current demand request, flight maneuver data, and the like. In one or more embodiments, controller 116 of charging station 100 may make a demand forecast based on information provided by electric vehicle 136. For example, and without limitation, controller 116 may use machine-learning to determine a demand forecast based on, for example, a demand request of electric vehicle 136. A machine-learning model may be created using training data, as further described in FIG. 7. For example, and without limitation, a machine-learning module and/or process may use a training data set, which includes training data, to generate an algorithm and create a machine-learning model that can determine a demand or supply forecast of an electric vehicle and/or power grid. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may include contain correlations that a machine-learning process may use to model relationships between two or more categories of data elements. The exemplary inputs and outputs may come from a database or be provided by a user. For example, and without limitation, inputs with known associated outputs may be inputted into a machine-learning model. The machine-learning module, which may then generate a machine-learning model that is trained using the training data so that the machine-learning model may receive inputs with unknown outputs and determine the corresponding outputs. In one or more embodiments, inputs may include operation data, which, for the purposes of this disclosure, is data representing electrical power needs and/or uses of an electric vehicle, such as expected maneuvers, travel plans, a state of charge of a power source of an electric vehicle, a depth of discharge of a power source of an electric vehicle, and the like. Using input data, a machine-learning model may determine a demand forecast, where a demand forecast, for the purposes of this disclosure, is an anticipated demand request of the electric aircraft from the power grid. Using the demand forecast, controller 116 may be determine a supply request of power grid 132. For example, and without limitation, if a demand request is expected to be low or there will be no demand request, then power grid 132 may transmit a supply request for electric vehicle 136 to transfer electrical power to power grid 132. In one or more embodiments, controller 116 may display demand forecast of electric aircraft 136. For example, and without limitation, controller 116 may display a determined demand forecast on a display, such as a display of a remote computing device or of charging station 100. By controller 116 determining a demand forecast, controller may identify a quantity of electrical power for charging station 100 to keep on reserve for electric vehicle 136 to reserve. Furthermore, demand forecast may also be a function of power availability from power grid 132, such as, for example, how much power can be provided by power grid 132 or solar array 128. Thus, charging station 100 may identify an amount of power to request via a supply request from electric vehicle 136.

In other exemplary embodiments of communication, and without limitation, an electrical contact without making physical contact, for example, by way of inductance, may be made between charging station 100 and electric vehicle 136 and/or power grid 132 to facilitate communication. Exemplary conductor materials include metals, such as without limitation copper, nickel, steel, and the like. In one or more embodiments, a contact of charging station 100 may be configured to provide electric communication with a mating component within port of electric vehicle 136. In one or more embodiments, contact may be configured to mate with an external connector. In one or more embodiments, connector may be positioned at a distal end of a tether or a bundle of tethers, e.g., hose, tubing, cables, wires, and the like, of charging station 100, and connector may be configured to removably attach with a mating component, for example and without limitation, a port of electric vehicle 136. As used in this disclosure, a "port" is an interface configured to receive another component or an interface configured to transmit and/or receive signal on a computing device. For example, in the case of an electric vehicle port, the port interfaces with a number of conductors and/or a coolant flow paths by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

In one or more embodiments, charging connection includes an electric connection between electric aircraft 136 and power grid 132, as discussed further in this disclosure.

Bidirectional charging may include a vehicle-to-grid (V2G) charging connection, a grid-to-vehicle (G2V) charging connection, or combination thereof. A V2G system may include a bidirectional electric vehicle charging station such as a trickle charger and may be used to supply power from an electric aircraft's battery to an electric grid via a DC-to-AC converter system usually embedded in a charging station. In a non-limiting embodiment, V2G may be used to balance and settle local, regional, or national energy needs via smart charging. For example, charging station 100 may power an power grid 132 in the event of a failure of the electric grid. In one or more embodiments, powering the electric grid may be performed via trickle charging by charging station 100. Additionally, charging station 100 may include a vehicle-to-home (V2H) charging. "Failure," for the purposes of this disclosure, refer to defects in design, process, quality, or part application, which are the underlying cause of a failure, or which initiate a process which leads to failure. Failure may further refer to a state or event of an electrical component that is unable to perform the action of delivering electrical energy. In a non-limiting embodiment, a bidirectional electric vehicle charging station may be used to supply power from an electric aircraft's battery to a house or, possibly, another kind of infrastructure. This may be done via a DC to AC converter of charging station 100. Like V2G, V2H may help to make balance and settle, at a larger scale, local or even national supply grids. In a non-limiting embodiment, charging station 100 may trickle charge power grid 132 by delivering electricity to the power grid 132 from the electric vehicle recharging component's battery storage system 112. A "trickle charge," for the purposes of this disclosure, refers to the process of charging a fully charged battery at a rate equal to its self-discharge rate, thus enabling the battery to remain at its fully charged level. In a non-limiting embodiment, the state of fully charged occurs almost exclusively when the battery is not loaded, as trickle charging will not keep a battery charged if current is being drawn by a load, which may include, but not limited to, a battery of an electric aircraft, supplemental storage unit of an electric grid, and the like. In one or more embodiments, charging station 100 may further deliver power to an electric grid by trickle charging power grid 132 from the electric aircraft's own battery. A trickle charger may include a battery charger that produces a very small current. Trickle charging may include providing a power output exceeding a power consumption requirement of charging station 100. "Power consumption requirement," for the purposes of this disclosure, refer to an electrical energy per unit time, required to operate an electrical component. In a non-limiting embodiment, the electric vehicle recharging component may be configured by at least a computing device to increase the power output of the battery storage system 112 of a trickle charger to power an power grid 132. In a non-limiting embodiment, trickle charging may include charging a battery at a rate equal to a battery's self-discharge rate such that the battery remains at a specific threshold of charge. The computing device may determine a charge cycle including a recharge rate and discharge rate of the battery storage system 112 of charging station 100 as a function of at least a machine-learning model. "Charge cycle," for the purposes of this disclosure, refer to a process of recharging and discharging an electric energy source as required into a load which may include, but not limited to, a battery of an electric aircraft, supplemental storage unit of an electric grid, and the like. The charge cycle may be determined as a function of a machine-learning model wherein the machine-learning model may receive a set of training data including, but not limited to, rate of a charge cycle of an electric grid, rate of charge of an electric vehicle, and rate of charge of an electric vehicle recharging component, and train the set with a classification of failure modes to determine the charge cycle to recharge an electric grid when a computing device detects a failure of the electric grid. In a non-limiting embodiment, A trickle charger may deliver a charge cycle that is equal to the batteries rate of self-discharge and should be disconnected once a full charge has been established to avoid overcharging. Charging station 100 may include a maintenance charger that may be designed to stay connected to a battery storage system 112. Once a charge level is set, the trickle charger may automatically turn off and on to maintain a specified charge range.

Still referring to FIG. 1, charging station 100 may include, but is not limited to, a constant voltage charger, a constant current charger, a taper current charger, a pulsed current charger, a negative pulse charger, an IUI charger, throttle charger, and a float charger. Still referring to FIG. 1, charging station 100 may include a bidirectional device communication device, such as a transceiver. Bidirectional device 108 may include a DC-distribution system, wherein the system is a device that is used to regulate and monitor the flow of power between a DC bus and an AC grid and to restrict the voltage expanse at the former to only a certain permissible range of voltages. In other words, a bidirectional inverter is the one that not only performs the DC-to-AC conversion, but also performs the conversion of AC power to DC. In a non-limiting embodiment, bidirectional inverter 108 may include a DC-to-DC bidirectional converter wherein DC-to-DC bidirectional converter allows power flow in both forward and reverse directions. In a non-limiting embodiment, DC-to-DC bidirectional inverter may convert a fixed DC battery voltage into a higher DC voltage suitable for traction motor. Bidirectional device 108 may also include, but not limited to, a DC-to-AC inverter, DC-to-AC inverter, and the like. In a non-limiting embodiment, charging station 100 may perform bidirectional charging as a function of an electric vehicle and an electric grid. A person of ordinary skill in the art would appreciate the use of a power inverter in the context of delivering energy from one source to another.

With continued reference to FIG. 1, charging station 100 may deliver charge to an electric vehicle. In a non-limiting embodiment, charging station 100 may deliver electric power to electric aircraft 136 using a trickle charger to trickle charge the electric aircraft as a function of bidirectional charging. The trickle charger may deliver power stored in the battery storage system 112 and/or from a power storage unit directly from an electric grid to power an electric aircraft. Trickle charging an electric aircraft 136 may include a trickle charging a battery storage system 112 with charging station to fully charged in which a DC-to-DC converter may deliver electricity from the battery to the electric aircraft or a battery unit of the electric aircraft.

Still referring to FIG. 1, charging station 100 may include a battery storage system 112. Battery storage system 512 may include a power storage unit which may include a battery pack. The battery pack may include a plurality of electrochemical battery cells. Battery storage system 112 may include any battery unit or component described herein. In a non-limiting embodiment, a trickle charger may receive power from a battery storage system 112. Battery storage system 112 may include and/or be associated with a DC-to-DC converter to convert power into a variety of voltages for electric vehicle recharging component 504. may actively switch between multiple power sources.

With continued reference to FIG. 1, charging station 100 may throttle charge electric aircraft 136. For example, and without limitation, charging station 100 may be configured to throttle a charge rate by restricting a maximum charge rate to an electric vehicle 136 in order to extend the battery life of a battery pack of electric aircraft 136. In one or more embodiments, different power capabilities of the electric grid 532 may include different charge cycles associated with different times during the day. In a non-limiting embodiment, the power grid 132 may be delivering electric power to an charging station 100 at a higher rate of charge during the morning and afternoon of a day and deliver a lower rate of charge during the evening of that day. In other embodiments, charging rates may be determined by environmental factors, such as a time of day or weather conditions. The compensation of electric energy may be determined as a function of a computing device and/or a machine-learning model, as discussed further herein.

With continued reference to FIG. 1, charging station 100 is in electrical communication with power grid 132. Power grid 132 may include, but not limited to, a power station, electrical substation, electric power transmission, electric power distribution, and the like. Electric grid may refer to any interconnected network for delivering electricity from a first entity to a second entity. "Entity," as used in this disclosure, refers to any entity that retrieves, stores, and/or outputs an energy source including, but not limited to, a producer, consumer, home, business, other infrastructure, electric vehicle, eVTOL, and the like. In one or more embodiments, power grid 132 may be in communication with at least a photovoltaic (PV) module, for instance by way of intermediate components (e.g., solar inverter 124). The PV module may include, but is not limited to, a plurality of solar panels, a plurality of solar arrays 128, any combination thereof, and the like. Power grid 132 may supply electricity to entities within a specific geographical location or deliver electricity from a first entity to a second entity.

Still referring to FIG. 1, power grid 132 may be in communication with a solar inverter 124. Solar inverter may include, but is not limited to, a stand-alone inverter, grid-tie inverter, battery backup inverter, intelligent hybrid inverter, and the like. Solar inverter 124 may include a type of electrical converter which converts the variable direct current (DC) output of a photovoltaic (PV) solar panel into a utility frequency alternating current (AC) that can be fed into a commercial power grid (e.g., electric grid) or used by a local, off-grid electrical network. In one embodiment, solar inverter 124 may be configured to absorb solar energy and transform the solar energy into electrical energy. Additionally, battery storage system 112 can also supply the electric grid 132 power grid 132 or solar inverter 124 with internally stored energy. In a non-limiting embodiment, in installations with a unidirectional inverter, most of the existing installations of the battery storage system 112 could be connected (as an option) on the AC side of the solar inverter 124.

Still referring to FIG. 1, charging station 100 includes a controller 116. Controller 116 may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of charging station 100 and/or computing device.

With continued reference to FIG. 1, computing device may be designed and/or configured to perform any method, method step, or sequence of method steps in any embodiment described in this disclosure, in any order and with any degree of repetition. For instance, [computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In one or more embodiments, controller 116 of charging station 100 may generate a power datum 120. A "power datum," for the purposes of this disclosure, refers to a physical or electrical value of a charging connection representing the charge and/or flow of electricity from one energy source to another energy source. For example, and without limitation, power datum may include a SOC of a battery of electric aircraft 136, a voltage rating of battery of electric aircraft 136, or the like. Controller 116 may further include a sensor. Sensor may include, but not limited to, a multimeter, voltmeter, valve electrometer, solid-state electrometer, and the like. Controller 116 may use a machine-learning model to generate power datum 120 using training data from electric aircraft 126 and charging station 100. In a non-limiting embodiment, a computing device may receive a plurality of data from an electric vehicle, electric recharging, and an electric grid to provide ancillary services to the electric recharging system. Ancillary services may include functions that help grid operators maintain a reliable electricity system. Ancillary services may maintain the proper flow and direction of electricity, address imbalances between supply and demand, and help the system recover after a power system event. Ancillary services may include recharging an electric grid in the event of a failure of the electric grid wherein the controller may direct a trickle charge from at least a battery storage system 112 to power grid 132. In a non-limiting embodiment, controller 116 may use a machine-learning model to perform V2G charging wherein the machine-learning model may generate power datum 120 that may include a discharge and recharge rate for charging that is equal to the power storage unit's rate of self-discharge and should be disconnected once a full charge has been established to avoid overcharging of the power grid 132. The machine-learning model may further include machine-learning algorithms to calculate a discharge and recharge rate that may optimally deliver electricity from at least an electric vehicle recharging component's battery storage system and at least an electric aircraft's own battery unit to an electric grid in the event of an electric grid's failure without overcharging the electric grid's own power storage unit. In a non-limiting embodiment, a machine-learning model may further detect the state of any battery or power storage unit it may be electronically connected to and charge any dead battery or power storage unit.

In one or more embodiments, a supply request may be transmitted by power grid 132 to controller 116 of charging station 100, which is ultimately received by electric aircraft 136. For the purposes of this disclosure, a "supply request" is a signal requesting power be supplied from electric aircraft 136 to power grid 132. In one or more embodiments, supply request may also include datum regarding the amount of power transferred between electric aircraft 136 and power grid 132, the price of the transaction, verification data, which may include data regarding the type of electric vehicle and authority to use a particular power grid 132 and/or charging station 100, or the like. The transfer of power stored in, for example, a battery, of an electric aircraft to a local power grid via a charging connection created by charging station 100 allows power grid 132 to meet high demands of power. A corresponding utility company, such as facility managers, may initiate a transmission of a supply request, which is transmitted to aircraft users or owners that are connected to power grid 132 via charging station 100. In one or more embodiments, a supply request may include information such as pricing of the power, an amount of needed power, a voltage of the power, or the like. In one or more embodiments, power grid 132 may include a sensor that monitors and provides information regarding a status or parameter of power grid 132, such as a failure experienced by a component of power grid 132 that requires power grid 132 to be recharged by electric aircraft 136. In other embodiments, a third party may send a supply request on behalf of the power grid.

In one or more embodiments, a demand request may be transmitted by electric aircraft 136 to charging station 100 of charging station 100. For the purposes of this disclosure, a "demand request" is a signal requesting power be supplied from power grid 132 be provided to electric aircraft 136. In one or more embodiments, a demand request may include information such as pricing of the power, an amount of needed power, a voltage of the power, or the like. In one or more embodiments, electric aircraft 136 and/or a battery thereof may include a sensor that monitors and provides information regarding a status or parameter of a power source of the battery of the electric aircraft, such as a recharged of the battery of the electric aircraft 136 prior to a planned flight. In other embodiments, a third party, such as a local utility member, may send a supply request on behalf of the power grid. In one or more embodiments, a demand request may include a prompt to controller 116 of charging station 100 inquiring about a pricing of power per unit, which controller 116 or power grid 132 may respond to. In one or more embodiments, electric aircraft 136 includes a sensor that monitors a status, condition, and/or parameter of electric aircraft 136 and/or a battery thereof. For example, and without limitation, a battery management system of electric aircraft battery may provide a SOC of an electric aircraft battery, which may be included in the demand request, so that power grid may provide a specific amount of power to electric aircraft 136 based on the provided battery information.

In one or more embodiments, power datum or other information related to the transfer of power between electric aircraft 136 and power grid 132 via charging connection may be shown on a display of charging station 100 and/or a remote device for a user to view.

Figure 2:
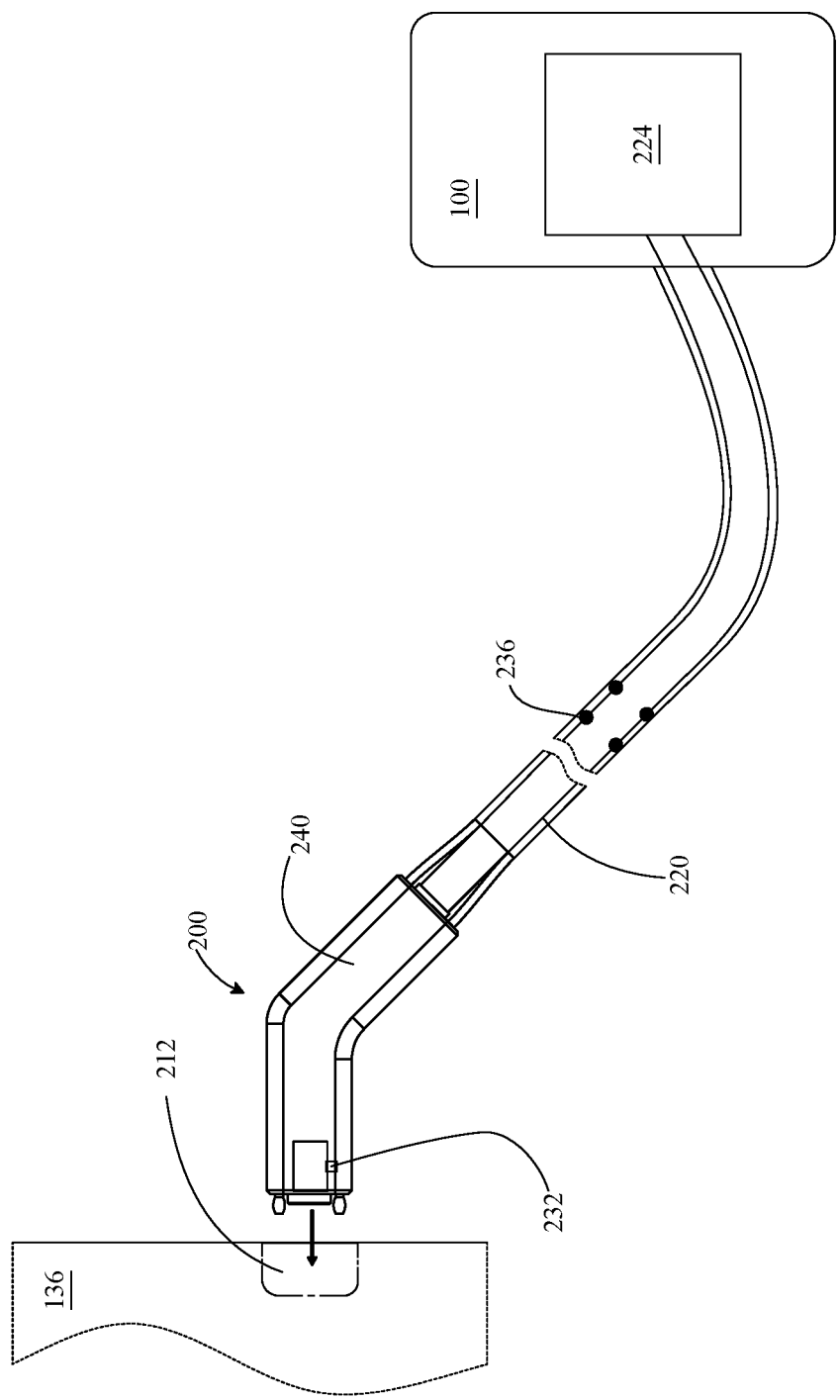
FIG. 2 illustrates an exemplary schematic of an exemplary connector for charging an electric aircraft in accordance with one or more aspects of the present disclosure.

Referring now to FIG. 2, an exemplary embodiment of a connector 200 of a charging station 100 for creating a charging connection between an electric vehicle 136 and charging station 100 is illustrated in accordance with one or more embodiments of the present disclosure. In one or more embodiments, charging station 100 may allow a recharging of electrical aircraft 116 or power grid 132 via a charging connection between electric vehicle 116 and power grid 132 that is facilitated by charging station 100. As used in this disclosure, "charging" refers to a process of increasing energy stored within an energy source. In some cases, an energy source includes a battery or battery modules and charging includes providing an electrical current to the battery.

Still, referring to FIG. 2, connector 200 includes a housing 240 configured to attach with an electric vehicle port 212 (also referred to herein as a "port") of an electric vehicle 136 to facilitate a charging connection between charging station and the electric aircraft, wherein the housing comprises a fastener for removable attachment with the electric vehicle port. In one or more embodiments, connector may be placed at a distal end of a tether or a bundle of tethers, e.g., hose, tubing, cables, wires, and the like, which is configured to removably attach with a mating component, for example without limitation a port. In the case of a computing device port, the port may provide an interface between a signal and a computing device. A connector may include a male component having a penetrative form and port may include a female component having a receptive form that is receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 1, connector 100 may include a housing. As used in this disclosure, a "housing" is a physical component within which other internal components are located. In some cases, internal components with housing will be functional while function of housing may largely be to protect the internal components. Housing and/or connector may be configured to mate with a port, for example an electrical vehicle port 212. As used in this disclosure, "mate" is an action of attaching two or more components together. As used in this disclosure, an "electric vehicle port" is a port located on an electric vehicle 216. Mating may be performed using an mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 200. In some cases, mate may be lockable. As used in this disclosure, an "electric vehicle" is any electrically power means of human transport, for example without limitation an electric aircraft or electric vertical take-off and landing aircraft. In some cases, an electric vehicle will include an energy source configured to power at least a motor configured to move the electric vehicle 116.

With continued reference to FIG. 2, connector 200 and/or housing of connector may include a fastener. As used in this disclosure, a "fastener" is a physical component that is designed and/or configured to attach or fasten two (or more) components together. Connector may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minn. Press-fastener may also include adhesives, including reusable gel adhesives, GECKSKIN adhesives developed by the University of Massachusetts in Amherst, of Amherst, Mass., or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferromagnetic material, and/or an electromagnet. Fastener may be configured to provide removable attachment between connector 100 and at least a port, for example electrical vehicle port 112. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 2, connector 200 may include a conductor 220 configured to conduct a current of charging connection. In one or more embodiments, connector 200 may include one or more conductors 220 having a distal end approximately located within connector 200. As used in this disclosure, a "conductor" is a component that facilitates conduction. As used in this disclosure, "conduction" is a process by which one or more of heat and/or electricity is transmitted through a substance, for example when there is a difference of effort (i.e. temperature or electrical potential) between adjoining regions. In some cases, a conductor 120 may be configured to charge and/or recharge an electric vehicle. For instance, conductor 220 may be connected to a energy source 224 and conductor may be designed and/or configured to facilitate a specified amount of electrical power, current, or current type. For example, a conductor 220 may include a direct current conductor 120. As used in this disclosure, a "direct current conductor" is a conductor configured to carry a direct current for recharging an energy source 224. As used in this disclosure, "direct current" is one-directional flow of electric charge. In some cases, conductor 220 may include an alternating current conductor. As used in this disclosure, an "alternating current conductor" is a conductor configured to carry an alternating current for recharging an energy source 224. As used in this disclosure, an "alternating current" is a flow of electric charge that periodically reverse direction; in some cases, an alternating current may change its magnitude continuously with in time (e.g., sine wave).

With continued reference to FIG. 2, charging station 100 may include a controller 116, as previously mentioned in this disclosure. In one or more embodiments, controller 116 is configured to receive a supply request or a demand request from power gird 132 or electric aircraft 136, respectively. In one or more embodiments, controller 116 may include any computing device as described in this disclosure, including without limitation a microcontroller, microprocessor, digital signal processor (DSP), logic circuit, integrated circuit (ASIC), FPGA, flight controller, control circuit, computing device, and/or system on a chip (SoC). In one or more embodiments, controller 104 may be configured to a control charging connection between electric vehicle 116 and charging station 100. In some embodiments, controller 116 may initiate charging according to a request signal from either electric aircraft 136 or power grid 132. Controller 116 may include a single computing device operating independently, or may include two or more computing devices operating in concert, in parallel, sequentially or the like; two or more computing devices may be included together in a single computing device or in two or more computing devices. Controller 116 may interface or communicate with one or more additional devices as described below in further detail via a network interface device. Network interface device may be utilized for connecting controller 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 116 may distribute one or more computing tasks as described below across a plurality of computing devices of computing device, which may operate in parallel, in series, redundantly, or in any other manner used for distribution of tasks or memory between computing devices. Controller 116 may be implemented using a "shared nothing" architecture in which data is cached at the worker, in an embodiment, this may enable scalability of system and/or computing device.

With continued reference to FIG. 2, controller 1116 may be designed and/or configured to perform any method, method step, or sequence of method steps in any embodiment described in this disclosure, in any order and with any degree of repetition. For instance, controller 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As used in this disclosure, a "control signal" is an electrical signal containing information that changes a performance of a connector and/or charging station. In this disclosure, "control pilot" is used interchangeably in this application with control signal. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal includes commands to operate a connector 200 of charging station 100, as previously mentioned. For example, and without limitation, control signal may control flow of an electric recharging current or switches, relays, direct current to direct current (DC-DC) converters, and the like. In some cases, one or more circuits within energy source 224 or within communication with energy source 224 are configured to affect a parameter of electrical recharging current according to a control signal from controller 116, such that the controller 116 may control a parameter of the electrical charging current provided to either power grid 132 or electric aircraft 136. For example, in some cases, controller 116 may control one or more of current (Amps), potential (Volts), and/or power (Watts) of electrical charging current by way of control signal. In some cases, controller 116 may be configured to selectively engage electrical charging current, for example ON or OFF by way of control signal.

In some cases, a demand request, supply request, and control signal may include an analog signal or a digital signal. In some cases, demand request, supply request, and control signal may be communicated from one or more sensors, for example, located within electric vehicle (e.g., within an electric vehicle port) and/or located within charging station 100, such as connector 200. In one or more embodiments, demand request or supply request is a command from a user or local and/or remote sensor. In some cases, a sensor, a circuit, and/or a controller 116 may perform one or more signal processing steps on a signal. For instance, sensor, circuit or controller 116 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

In one or more embodiments, controller 116 may be configured to control an electrical charging current through conductor 200. In one or more embodiments, connector 200 may be configured such that a conductor 220 may make a connection with a mating component on within an electric vehicle port 212 of electric vehicle 136 when the connector 200 is mated with electric vehicle port 112. As used in this disclosure, a "mating component" is a component that is configured to connected with at least another component, for example in a certain (i.e. mated) configuration.

With continued reference to FIG. 2, charging station 100 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port and/or test port. In some cases, a proximity signal may include an analog signal, a digital signal, an electrical signal, an optical signal, a fluidic signal, or the like. In some cases, a proximity signal conductor 120 may be configured to conduct a proximity signal indicative of attachment between connector 100 and a port, for example electric vehicle port 212.

In one or more embodiments, charging station 100 may include a sensor. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port of an electric vehicle. Proximity sensor may include any sensor described in this disclosure, including without limitation a switch, a capacitive sensor, a capacitive displacement sensor, environmental sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

In one or more embodiments, charging station 100 may include a sensor 132 communicatively connected to a battery of electric aircraft 136 and configured to detect a parameter of electric aircraft 136 or electric aircraft battery pack. such as a charging connection between electric vehicle 116 and charging station 100. In one or more embodiments, a sensor is configured to identify a communication of charging connection. For instance, and without limitation, sensor 132 may recognize that a charging connection has been created between charging station 100 and electric vehicle 136 that facilitates communication between charging station 100 and electric vehicle 136. For example, and without limitation, sensor may identify a change in current through a connector of charging station 100, indicating whether charging station is providing power to electric aircraft 136 or power grid 132, as previously mentioned in this disclosure.

In one or more embodiments, sensor 132 may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. Sensor may detect a plurality of data about charging connection, electric vehicle 136, power grid 132, and/or charging station 100. A plurality of data about, for example, charging connection may include, but is not limited to, battery quality, battery life cycle, storage unit capacity, storage unit SOC, remaining battery capacity, current, voltage, pressure, temperature, moisture level, and the like. In one or more embodiments, and without limitation, sensor may include a plurality of sensors. In one or more embodiments, and without limitation, sensor may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor may be a contact or a non-contact sensor. For instance, and without limitation, sensor may be connected to electric vehicle 136, power grid 132, charging station 100, and/or a controller 104. In other embodiments, sensor may be remote to electric vehicle 136, charging station 100, power grid 132, and/or controller 116. Signals may include electrical, electromagnetic, visual, audio, radio waves, or another undisclosed signal type alone or in combination.

Sensor may include a plurality of independent sensors, where any number of the described sensors may be used to detect any number of physical or electrical quantities associated with communication of charging connection. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor to detect phenomenon may be maintained.

In one or more embodiments, sensor may include electrical sensors. Electrical sensors may be configured to measure voltage across a component, electrical current through a component, and resistance of a component. In one or more embodiments, sensor 108 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

With continued reference to FIG. 2, charging station 100 may include an energy source 224 configured to provide an electrical charging current. As used in this disclosure, a "energy source" is a source of electrical power, for example for charging a battery or storage unit. In some cases, energy source 224 may include a charging battery (i.e., a battery used for charging other batteries. A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. Charging battery 224 may include a plurality of batteries, battery modules, and/or battery cells. Charging battery 224 may be configured to store a range of electrical energy, for example a range of between about 5 KWh and about 5,000 KWh, that may be receive from power grid 132.

Still referring to FIG. 2, in some embodiments, charging station 100 may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric vehicle and conductors may provide an alternating current to the electric vehicle by way of conductors 220 and connector 200. Alternatively and/or additionally, in some cases, AC-DC converter may be located outside of electric vehicle and an electrical charging current may be provided by way of a direct current to the electric vehicle. In some cases, AC-DC converter may be used to recharge a charging battery. In some embodiments, energy source 224 may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, energy source 224 may be charged by a power source of electric aircraft 136 and then provide power to power grid 132.

Still referring to FIG. 2, in some embodiments, a direct current conductor and an alternating current conductor may be further configured to conduct a communication signal and/or control signal by way of power line communication. In some cases, controller 116 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor. Different types of power-line communications use different frequency bands. In some case, alternating current may have a frequency of about 50 or about 60 Hz. In some cases, power conductor may be shielded in order to prevent emissions of power line communication modulation frequencies. Alternatively or additionally, power line communication modulation frequency may be within a range unregulated by radio regulators, for example below about 500 KHz.

Figure 3:
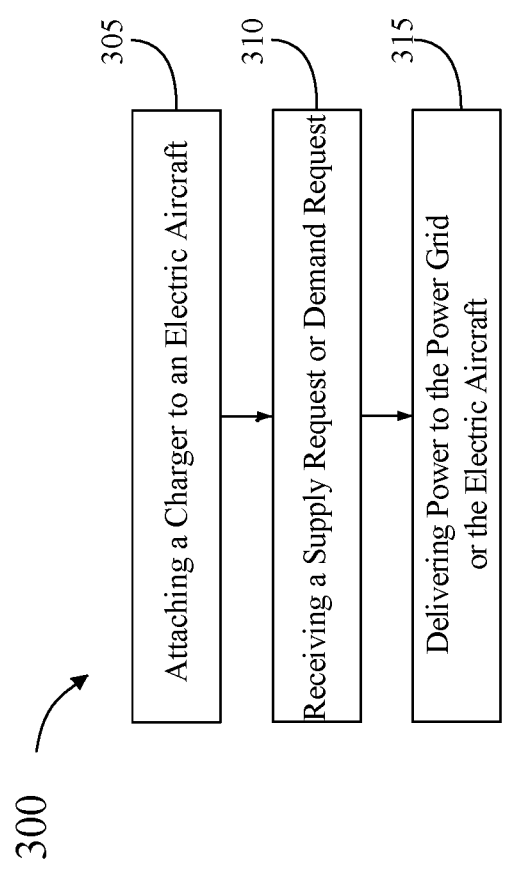
FIG. 3 is a flow chart showing an exemplary embodiment of a method of providing power to an electric aircraft or a power grid in accordance with one or more aspects of the present disclosure.

Referring now to FIG. 3, a flow chart of an exemplary embodiment of a method 300 for transferring power via a charging connection between electric aircraft 136 and power grid 132 is shown. As shown in step 305, method 300 includes removably attaching, by connector 200 of a charging station 100, charging station 100 to electric aircraft 136, as discussed previously in this disclosure. These steps may be implemented as described above, without limitation, in FIGS. 1-8.

As shown in step 310, method 300 includes receiving, by controller 116 of charging station 100, a supply request from power grid 132 or a demand request from electric aircraft 136. In one or more embodiments, method 300 further includes, connecting, by controller 116, to a network of electric aircraft 136 to forecast a demand request of electric aircraft 136. In one or more embodiments, method 300 further includes providing, by controller 116, power via charging connection from electric aircraft 136 to power grid 116 as a function of a supply request. In one or more embodiments, method 300 further includes providing, by controller 116, power via charging connection from power grid 132 to electric aircraft 136 as a function of a demand request. These steps may be implemented as described above, without limitation, in FIGS. 1-8.

As shown in step 315, method includes delivering power between power grid 132 and electric aircraft 136 via a charging connection provided by charging station 100. In one or more embodiments, method 300 further includes detecting, by an electrical sensor communicatively connected to the charging connection, a current of the charging connection. These steps may be implemented as described above, without limitation, in FIGS. 1-8.

Figure 4:
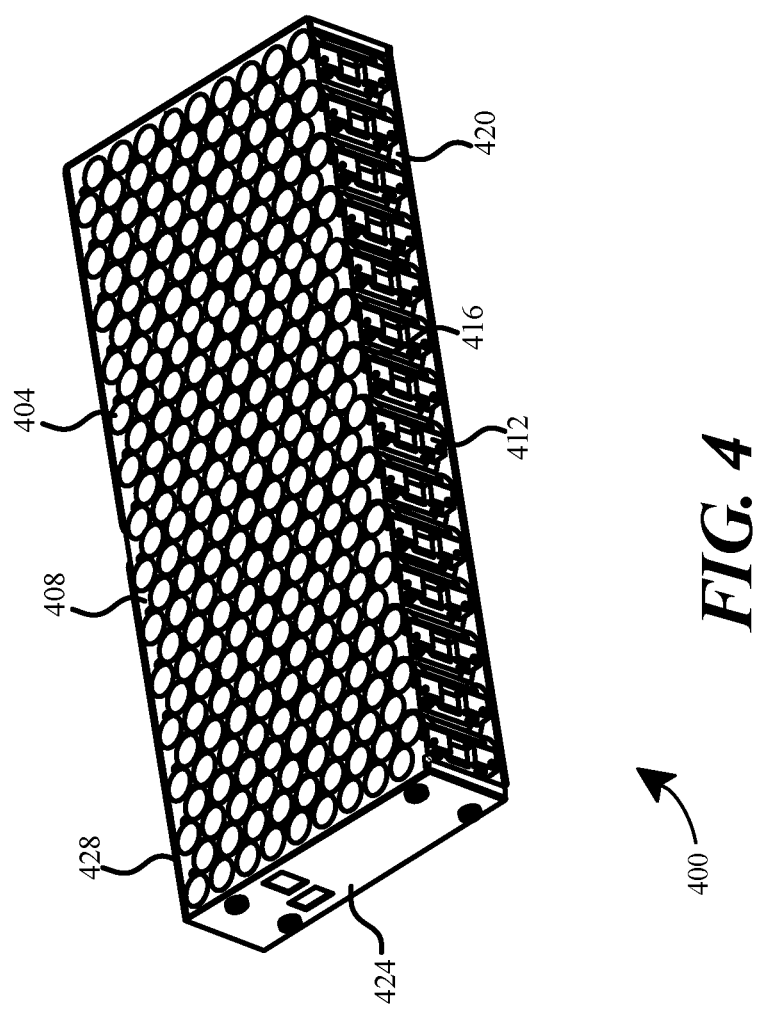
FIG. 4 schematically illustrates an exemplary battery module in accordance with one or more aspects of the present disclosure.

Referring now to FIG. 4, an exemplary energy source is shown in accordance with one or more embodiments of the present disclosure. Battery module 400 with multiple battery units 416 is shown. Battery module 400 may comprise a battery cell 404, cell retainer 408, cell guide 412, protective wrapping, back plate 420, end cap 424, and side panel 428. Battery module 400 may comprise a plurality of battery cells, an individual of which is labeled 404. In embodiments, battery cells 404 may be disposed and/or arranged within a respective battery unit 416 in groupings of any number of columns and rows. For example, in the illustrative embodiment of FIG. 4, battery cells 404 are arranged in each respective battery unit 416 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 4 battery cells 404 are arranged 18 to battery unit 416 with a plurality of battery units 416 comprising battery module 400, one of skill in the art will understand that battery cells 404 may be arranged in any number to a row and in any number of columns and further, any number of battery units may be present in battery module 400. According to embodiments, battery cells 404 within a first column may be disposed and/or arranged such that they are staggered relative to battery cells 404 within a second column. In this way, any two adjacent rows of battery cells 404 may not be laterally adjacent but instead may be respectively offset a predetermined distance. In embodiments, any two adjacent rows of battery cells 404 may be offset by a distance equal to a radius of a battery cell. This arrangement of battery cells 404 is only a non-limiting example and in no way preclude other arrangement of battery cells.

In embodiments, battery cells 404 may be fixed in position by cell retainer 408. For the illustrative purposed within FIG. 4, cell retainer 408 is depicted as the negative space between the circles representing battery cells 404. Cell retainer 408 comprises a sheet further comprising circular openings that correspond to the cross-sectional area of an individual battery cell 404. Cell retainer 408 comprises an arrangement of openings that inform the arrangement of battery cells 404. In embodiments, cell retainer 408 may be configured to non-permanently, mechanically couple to a first end of battery cell 404.

According to embodiments, battery module 400 may further comprise a plurality of cell guides 412 corresponding to each battery unit 416. Cell guide 412 may comprise a solid extrusion with cutouts (e.g., scalloped) corresponding to the radius of the cylindrical battery cell 404. Cell guide 412 may be positioned between the two columns of a battery unit 416 such that it forms a surface (e.g., side surface) of the battery unit 416. In embodiments, the number of cell guides 412 therefore match in quantity to the number of battery units 416. Cell guide 412 may comprise a material suitable for conducting heat.

Battery module 400 may also comprise a protective wrapping woven between the plurality of battery cells 404. Protective wrapping may provide fire protection, thermal containment, and thermal runaway during a battery cell malfunction or within normal operating limits of one or more battery cells 404 and/or potentially, battery module 400 as a whole. Battery module 400 may also comprise a backplate 420. Backplate 420 is configured to provide structure and encapsulate at least a portion of battery cells 404, cell retainers 408, cell guides 412, and protective wraps. End cap 424 may be configured to encapsulate at least a portion of battery cells 404, cell retainers 408, cell guides 412, and battery units 416, as will be discussed further below, end cap may comprise a protruding boss that clicks into receivers in both ends of back plate 420, as well as a similar boss on a second end that clicks into sense board. Side panel 428 may provide another structural element with two opposite and opposing faces and further configured to encapsulate at least a portion of battery cells 404, cell retainers 408, cell guides 412, and battery units 416.

Still referring to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft and/or a cart 100. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term "wired", but one of ordinary skill in the art would appreciate that this term is synonymous with "electrically connected", and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

According to embodiments, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

According to embodiments, battery module 400 may also comprise first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board.

Battery module 400 may also comprise at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

Figure 5:
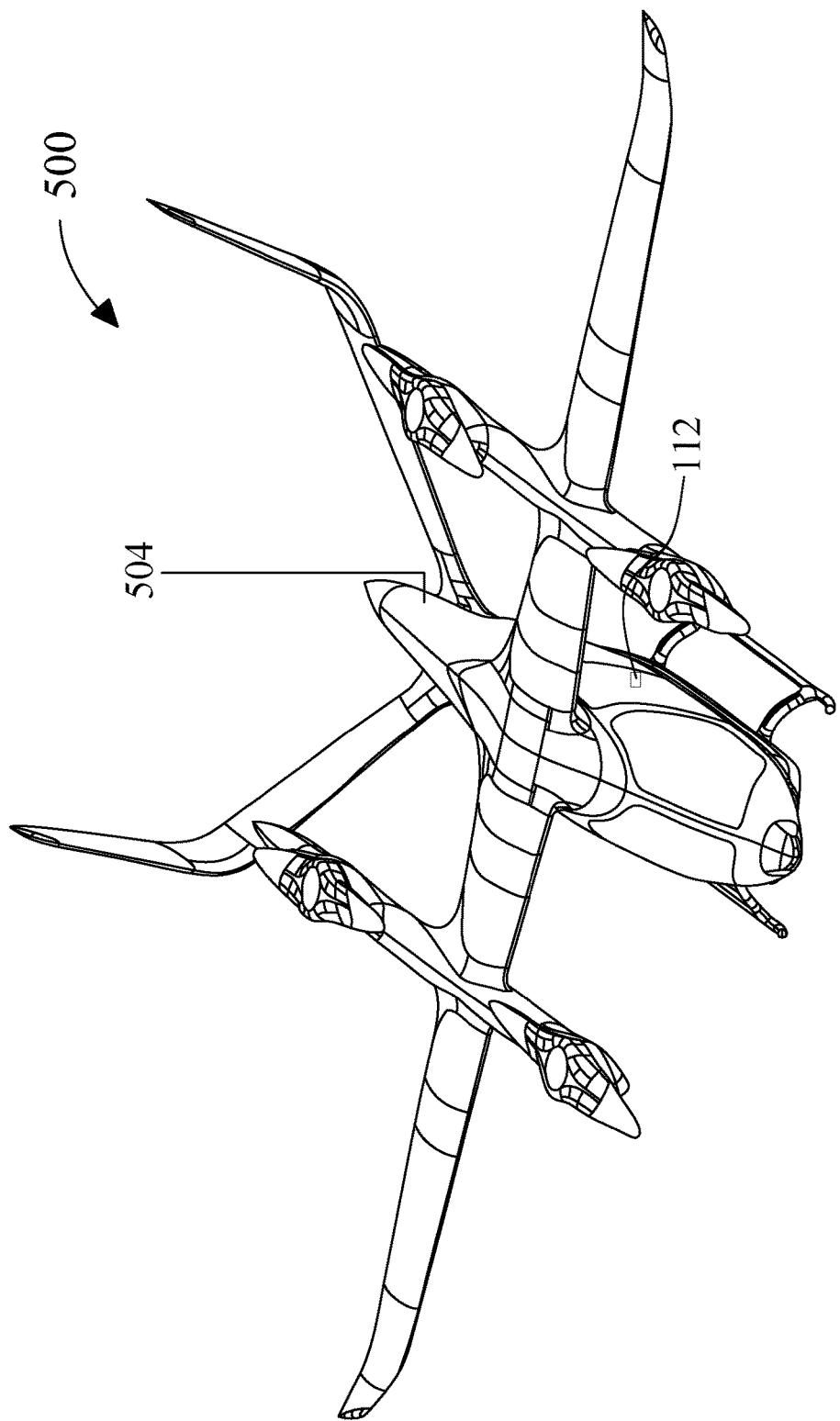
FIG. 5 is a schematic of an exemplary electric aircraft in accordance with one or more aspects of the present disclosure.

Referring now to FIG. 5, an exemplary embodiment of an aircraft 500 is illustrated. Aircraft 116 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 5, aircraft 500 may include a fuselage 504. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 504 may comprise structural elements that physically support the shape and structure of an aircraft. Structural elements may take a plurality of forms, alone or in combination with other types. Structural elements may vary depending on the construction type of aircraft and specifically, the fuselage. Fuselage 504 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper. In one or more embodiments, electric aircraft 116 includes port 112. In one or more embodiments port 112 may be disposed within fuselage.

Still referring to FIG. 5, port 112 may be electrically connected to an energy source of electric aircraft 500. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 5, aircraft 500 may include a sensor. Sensor may include any sensor or noise monitoring circuit. Sensor may be configured to sense a characteristic of charging connection or condition and/or parameter of a power source of electric aircraft 116. Sensor may be a device, module, and/or subsystem, utilizing any hardware, software, and/or any combination thereof to sense a characteristic and/or changes thereof, in an instant environment, for instance without limitation controller, which the sensor is proximal to or otherwise in a sensed communication with, and transmit information associated with the characteristic, for instance without limitation digitized data. Sensor may be mechanically and/or communicatively connected to aircraft 500. In other embodiments, sensor may be communicatively connected to charging station 100. Sensor may be configured to sense a characteristic associated with a power source of electric aircraft, such as a critical condition (e.g., overheating, overcurrent, gas detection, cell failure byproduct detection, moisture detection, and the like) and may transmit a control signal to controller 104 to terminate charging connection. Sensor may include one or more proximity sensors, position sensor, displacement sensors, vibration sensors, photoelectric sensors, infrared sensors, pressure sensor, electrical sensors, such as voltmeters and current sensors, moisture, sensors, chemical sensors, gas sensors, and the like. Sensor may be used to monitor the status of aircraft 500 for both critical and non-critical functions. Sensor may be incorporated into vehicle or aircraft or be remote.

In some cases, sensor 516 may sense a characteristic as an analog measurement, for instance, yielding a continuously variable electrical potential indicative of the sensed characteristic. In these cases, sensor 516 may additionally comprise an analog to digital converter (ADC) as well as any additionally circuitry, such as without limitation a Whetstone bridge, an amplifier, a filter, and the like. In one or more embodiments, sensor 516 may sense a characteristic through a digital means or digitize a sensed signal natively.

Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Figure 6:
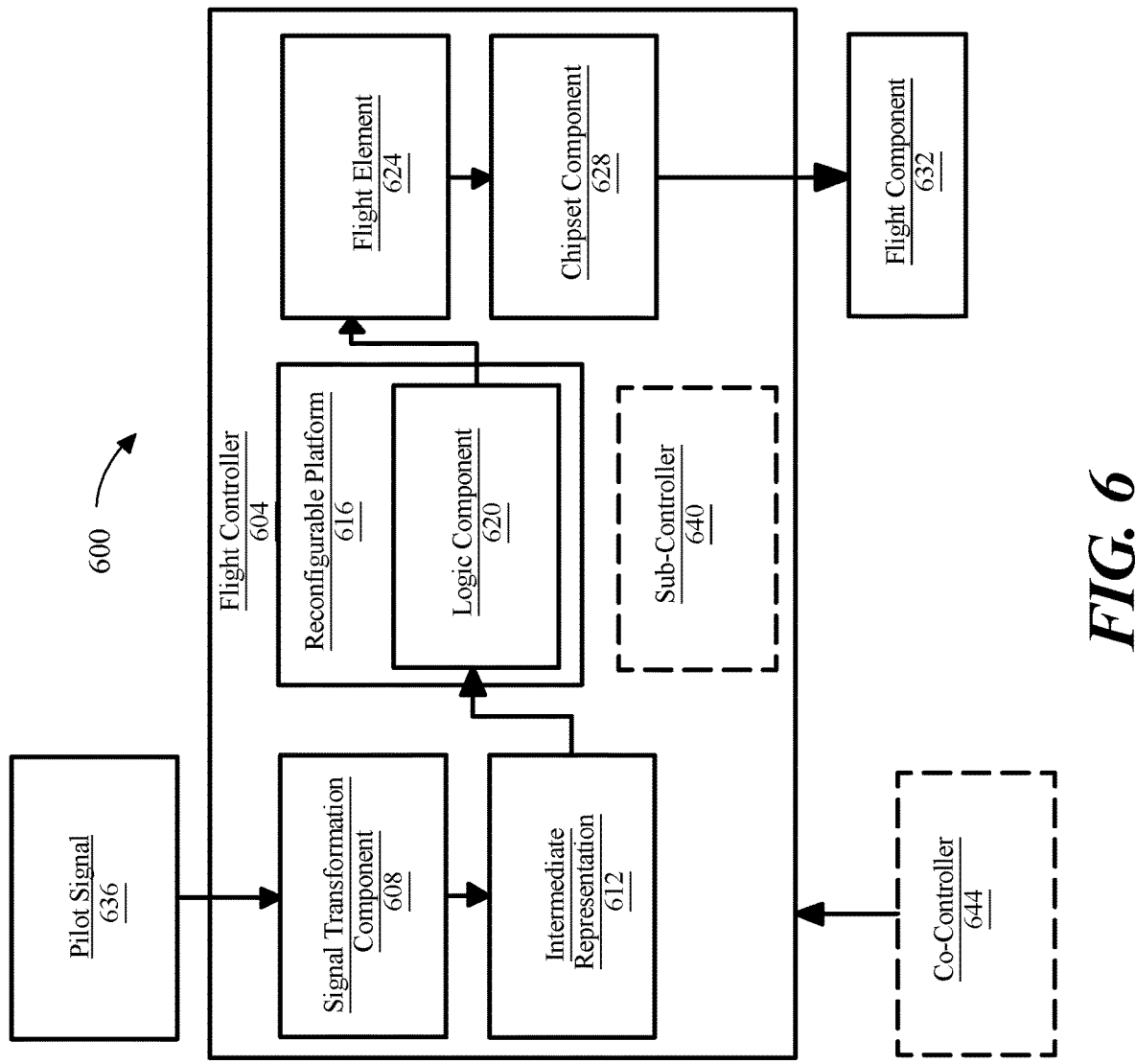
FIG. 6 is a block diagram depicting an exemplary flight controller in accordance with one or more aspects of the present disclosure.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
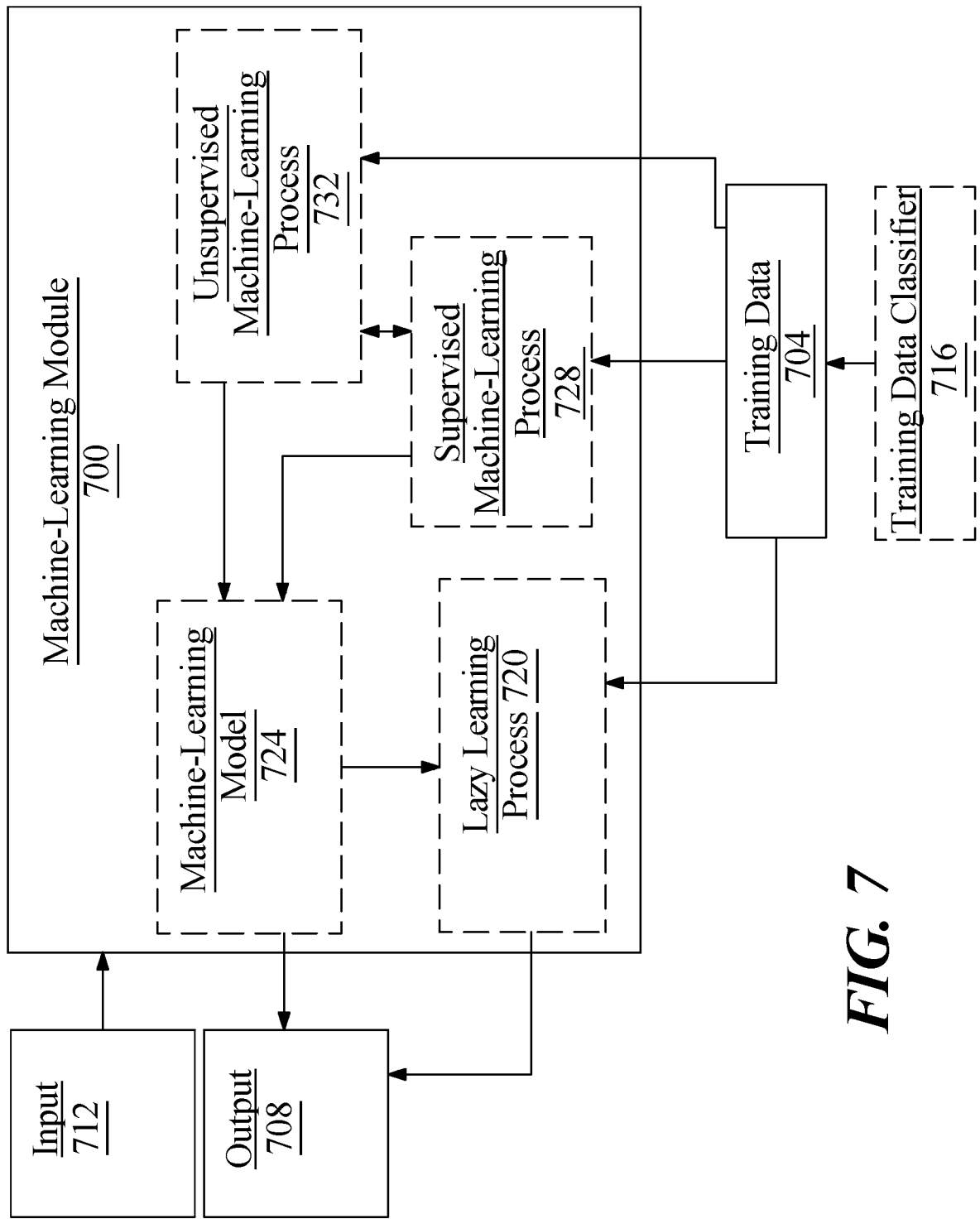
FIG. 7 is a block diagram of an exemplary machine-learning process in accordance with one or more aspects of the present disclosure.
Figure 8:
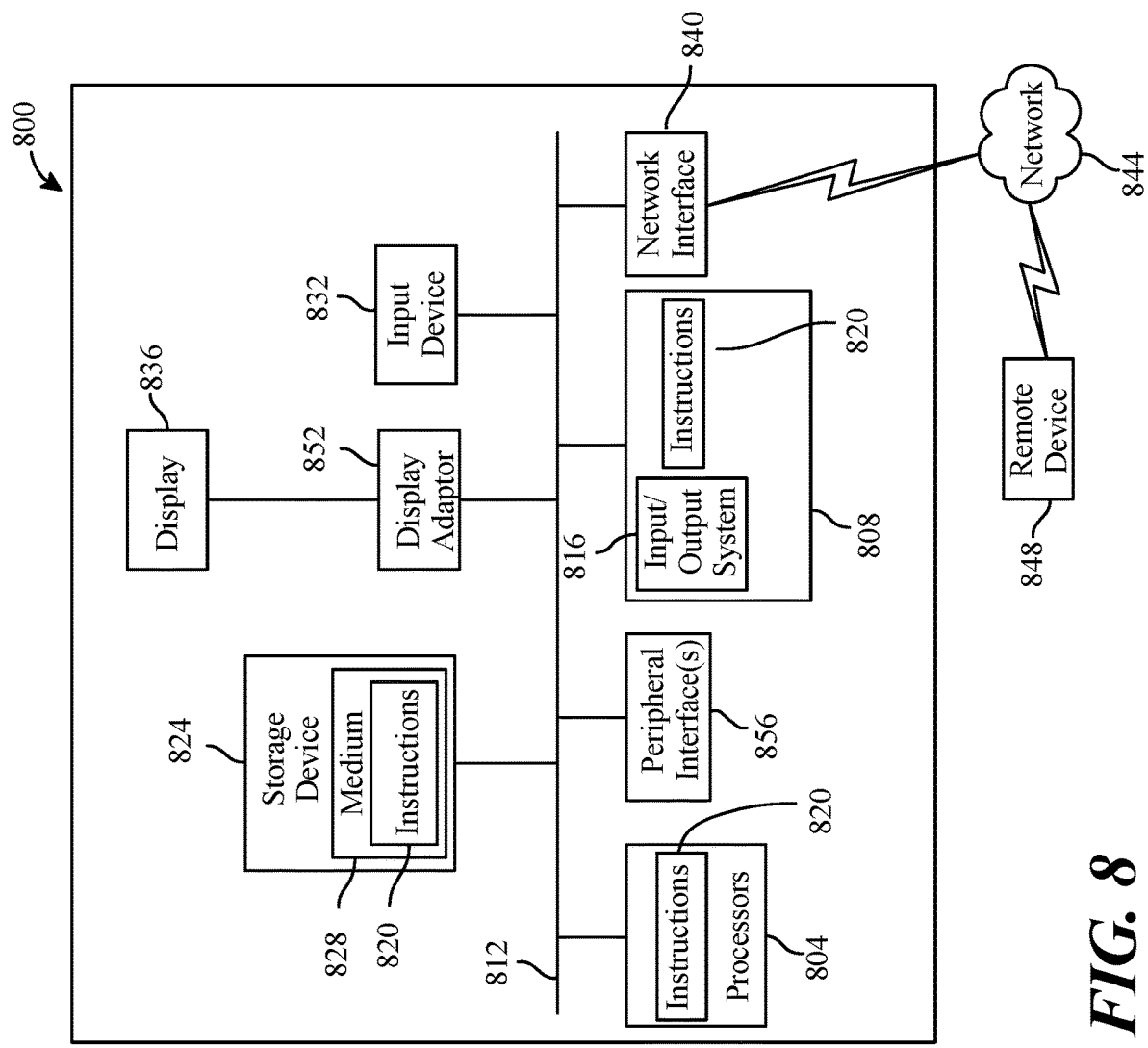
FIG. 8 is a block diagram of a computing system that can be used to implement any one or more of the methodologies disclosed herein and any one or more portions thereof.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods.

Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 9 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A charging station for an electric aircraft, the charging station comprising:
   an energy source configured to provide and store electrical power;
   a connector configured to removably attach to a port of the electric aircraft to create a charging connection between a power grid and the electric aircraft;
   a sensor configured to detect a plurality of data about the charging connection, the electric vehicle, the power grid, and the charging station;
   a controller configured to:
      provide power via the charging connection from the electric aircraft to the power grid as a function of a supply request and the plurality of data about the power grid detected by the sensor; and
      forecast the demand request of the electric aircraft as a function of a machine learning model.

2. The charging station of claim 1, wherein the controller is further configured to connect to a network of the electric aircraft to forecast the demand request of the electric aircraft.

3. The charging station of claim 2, wherein the supply request comprises an amount of electrical power to be provided.

4. The charging station of claim 1, wherein the controller is configured to provide power via the charging connection from the power grid to the electric aircraft as a function of a demand request.

5. The charging station of claim 4, wherein the demand request comprises an amount of electrical power to be provided.

6. The charging station of claim 5, wherein the supply request comprises a price related to the amount of electrical power to be provided.

7. The charging station of claim 1, wherein the controller is configured to communicate with the electric aircraft or power grid via a communication network.

8. The charging station of claim 7, wherein the communication network is wireless.

9. The charging station, of claim 7, wherein the communication network is a controller area network (CAN).

10. The charging station of claim 1, wherein the charging connection comprises an electric communication.

11. The charging station of claim 1, further comprising a sensor configured to detect a characteristic of the electric aircraft.

12. The charging station of claim 1, further comprising a connector configured to provide a mechanic communication with the electric aircraft, wherein the connector comprises a conductor configured to conduct a current.

13. The charging station of claim 12, wherein the conductor comprises an alternating current conductor configured to conduct an alternating current.

14. The charging station of claim 1, further comprising an electrical sensor communicatively connected to the charging connection and configured to detect a current of the charging connection.

15. The charging station of claim 1, wherein the controller is further configured to receive power datum.

16. The charging station of claim 1, wherein the electric aircraft is an electric vertical takeoff and landing (eVTOL) aircraft.

17. A method of transferring power via a charging connection between an electric aircraft and a power grid, the method comprising:
   removably attaching a connector of a charging station to the electric aircraft;
   detecting, by a sensor, a plurality of data about the charging connection, the electric vehicle, the power grid, and the charging station;
   receiving, by a controller of the charging station, the plurality of data detected by the sensor and at least one of a supply request from the power grid and a demand request from the electric aircraft;
   forecasting the demand request of the electric aircraft as a function of a machine learning model; and
   delivering power to at least one of the power grid and the electric aircraft via the charging connection created by the charging station based on the received request and the plurality of data detected by the sensor.

18. The method of claim 17, wherein the controller is further configured to connect to a network of the electric aircraft to forecast the demand request of the electric aircraft.

19. The method of claim 17, further comprising providing, by the controller, the power via the charging connection from the electric aircraft to the power grid as a function of a supply request.

20. The method of claim 17, further comprising providing, by the controller, the power via the charging connection from the power grid to the electric aircraft as a function of a demand request.

21. The method of claim 17, further comprising detecting, by an electrical sensor communicatively connected to the charging connection, a current of the charging connection.

* * * * *